United States Patent [19]

Gerding

[11] 4,436,266

[45] Mar. 13, 1984

[54] CONDUIT SUPPORT DEVICE

[76] Inventor: Thomas W. Gerding, 5805 Hawkins-Fuchs Rd., St. Louis, Mo. 63129

[21] Appl. No.: 362,551

[22] Filed: Mar. 26, 1982

[51] Int. Cl.³ .............................................. F16L 3/08
[52] U.S. Cl. .................................... 248/74 R; 248/65; 248/58
[58] Field of Search ................. 248/74 R, 74 A, 74 B, 248/74 PB, 62, 64, 58, 49, 65, 305, 306, 316 B, 316 F, 317

[56] References Cited

U.S. PATENT DOCUMENTS

| | | | |
|---|---|---|---|
| 2,013,965 | 9/1935 | Knight | 248/56 |
| 2,743,081 | 4/1956 | Lamb | 24/132 R |
| 2,824,312 | 2/1958 | Tortorice | 248/57 |
| 4,019,599 | 4/1977 | Strunk | 180/64 |
| 4,101,103 | 7/1978 | Mooney et al. | 248/62 |
| 4,126,095 | 11/1978 | Tillery | 24/132 R |
| 4,310,955 | 1/1982 | David | 24/248 B |

Primary Examiner—William H. Schultz
Assistant Examiner—Ramon O. Ramirez
Attorney, Agent, or Firm—Haverstock, Garrett & Roberts

[57] ABSTRACT

A conduit support device which can be mounted and is operable in all positions for holding and supporting a conduit member comprising a substantially U-shaped support frame member having a pair of spaced opposed leg members extending therefrom defining a space therebetween, a closure member pivotally mounted adjacent the free end of at least one of the leg members for controlling access to the space defined therebetween, the closure member being rotatably movable between a closed position restricting access to the space between the leg members and an open position angularly related thereto to open the space between the leg members for admitting a conduit member therebetween, the closure member being movable to its open position in response to a force exerted thereagainst in a direction towards the space defined between the leg members, a spring member for normally biasing the closure member towards its closed position regardless of its angular orientation when installed, and other mechanisms for restricting the movement of the conduit member once it is supported within the subject device. In its preferred embodiment, the subject device includes a closure member pivotally mounted to each respective leg member.

23 Claims, 8 Drawing Figures

CONDUIT SUPPORT DEVICE

The present invention relates to a suspension device adaptable for holding and supporting a pipe or other conduit member at a predetermined elevation and, more particularly, to an improved conduit support device including a support frame member having a cross portion and laterally spaced leg members extending therefrom defining an opening or space therebetween, closure means pivotally mounted near the free end portion of at least one leg member for rotational movement between a first closed position restricting access to the opening between the spaced leg members and a second open position angularly related thereto to open the space between the leg members for admitting a conduit member therebetween, and means biasing the closure means towards its closed position.

It is generally well known and a very common practice in the construction and maintenance industries to support conduit members such as gas, water, steam or compressed air carrying pipes, electrical cables, and other associated plumbing and/or utility carrying conduits from a ceiling or other support structure. This is usually accomplished by means of suspension devices which are attachable to the support structure and adaptable for holding and supporting the conduit members usually in generally horizontal positions. Many different types of suspension devices are available and have been employed for this specific purpose. Such known prior art constructions for the most part are characterized by complicated and cumbersome mechanisms which are inconvenient, awkward and difficult to handle and operate, and often require considerable manipulation on the part of the user in order to adequately couple and lock the conduit member in its supported position within the hanger assembly. See for examples the constructions shown in U.S. Pat. Nos. 850,623; 1,612,959; 2,111,357; 4,019,599; and 4,305,557. Other known constructions, although attempting to improve the versatility, reliability, and simplicity of such suspension devices, likewise suffer from certain disadvantages and shortcomings. For example, Mooney et al U.S. Pat. No. 4,101,103 discloses several embodiments of a cradle type bracket device which preferably utilizes a pair of closure arms swingably supported from spaced parallel leg members, the closure arms being restricted in their downward movement to approximately horizontal positions closing an access opening to the bracket device and being freely upwardly swingable to expose the access opening for receiving a conduit member therebetween. The closure arms associated with the Mooney et al device are swingably connected to the side leg members through a complicated pivotal arrangement which may easily cause the leg members to hang up or even possibly stick in an intermediate position thereby preventing free movement in opening and closing. In addition, the closure arms of the Mooney et al device are biased towards their respective closed positions by gravity alone and, for this reason, the Mooney et al device is not operable in all positions and therefore must be installed in such an orientation that the closure arms are moved by gravity to their respective closed positions. This is not true of the present construction as will be hereinafter explained. Additionally, none of the known suspension devices are as simple structurally as the present construction and none are operable in all positions regardless of their angular orientation when installed. For these and other reasons, the known prior art constructions have not been entirely satisfactory and have enjoyed limited usefulness.

The present device overcomes many of the disadvantages and shortcomings associated with the known suspension devices, and teaches the construction and operation of a relatively simple conduit support device which includes a substantially U-shaped support frame member having a cross portion and spaced parallel or substantially parallel leg members extending from the opposite ends thereof. In its preferred embodiment, each of the leg members has a closure gate pivotally mounted near the free end thereof for rotational movement between a first or closed position extending toward the opposite leg member to restrict access to the space between the spaced leg members and a second or open position angularly related to the closed position to open the space between the leg members for admitting a conduit member therebetween. Preferably, each closure gate includes means for biasing it towards its respective closed position and, when in their closed positions, the closure gates extend laterally towards one another closing or substantially closing the space between the free ends of the leg members. The closure gates and the respective leg members also have means thereon which become engaged in the closed position to restrict movement of the closure gates beyond their closed positions. The support frame member and the closure gates are dimensioned such that a pipe or other suitable conduit member to be supported may be inserted between the pair of closure gates and positions so as to lie within the enclosed space formed by the support frame member and the closure gates. The exertion of an inward force on the closure gates, such as by pushing the conduit member thereagainst, pivotally rotates the closure gates towards their open positions in opposition to the biasing means urging them closed and allows the user thereof to easily insert the conduit member within the hanger assembly. Once the conduit member is positioned therewithin and moved far enough to clear the free ends of the closure gates, the closure gates, through the urging force exerted by the biasing means, will be moved to their normally closed positions so as to be engagable with the conduit member to support it thereon and prevent it from coming out of the device. Once positioned within the subject device, the conduit member is confined and supported by the support frame member and the closure gates. Use of the biasing means for constantly urging the closure gates towards their respective closed positions ensures that the closure gates, upon insertion of a conduit member therebetween, will automatically return to their closed positions regardless of the angular orientation of the subject device when installed. This allows the subject device to be installed and used in any position, a feature not possible with the known prior art constructions.

Removal of a conduit member from within the subject device is likewise easily accomplished by simply moving the conduit member to a position such that the closure gates can be pivotally rotated to their open positions allowing access thereto and, while holding the closure gates on their open positions, the conduit member can be easily removed therefrom by passing it between the opened closure gates and through the space defined between the opposed leg members. This facilitates maintenance of the conduit member supported within the device and allows the device to be easily operated and manipulated, especially by one person.

The subject device may be suspended from an overhead structure or any other support structure by any suitable means such as by attaching it to a vertically disposed threaded support rod or by welding it to any suitable attaching member. The subject device may be dimensioned and constructed so as to conform to and accommodate conduit members of varying sizes and may also include means for restricting the movement of the conduit member once it is supported within the subject device.

An alternative embodiment of the subject device includes a single closure gate pivotally mounted near the free end of only one of the spaced leg members, the single closure gate being dimensioned to extend sufficiently across the space between the leg members such that when a conduit member is positioned within the support assembly, the closure gate, when in its closed position, will adequately hold and support the conduit member positioned therewithin.

It is therefore a principal object of the present invention to provide a simple and efficient conduit support device adaptable for holding and supporting a wide variety of conduit members at a predetermined elevation.

Another object is to provide a conduit support device which can be mounted and is operable in all angular orientations.

Another object is to provide a suspension device which facilitates the rapid mounting of conduit members.

Another object is to provide a conduit support device that is structurally and operationally relatively simple, durable, easy to install, and requires a minimum of manipulation to position and lock a conduit member therewithin.

Another object is to teach the construction and operation of a conduit support device which can be easily accessed by the user thereof for easy removal of a conduit member therefrom.

Another object is to reduce the time and labor required to support conduit members.

Another object is to provide a conduit support device wherein the closure means are able to move freely between their open and closed positions without hangup or sticking.

Another object is to provide a conduit support device including means for restricting the movement of the conduit member once it is positioned within the subject device.

These and other objects and advantages of the present invention will become apparent to those skilled in the art after considering the following detailed specification of several embodiments of the subject device in conjunction with the accompanying drawings wherein.

Figure 1:
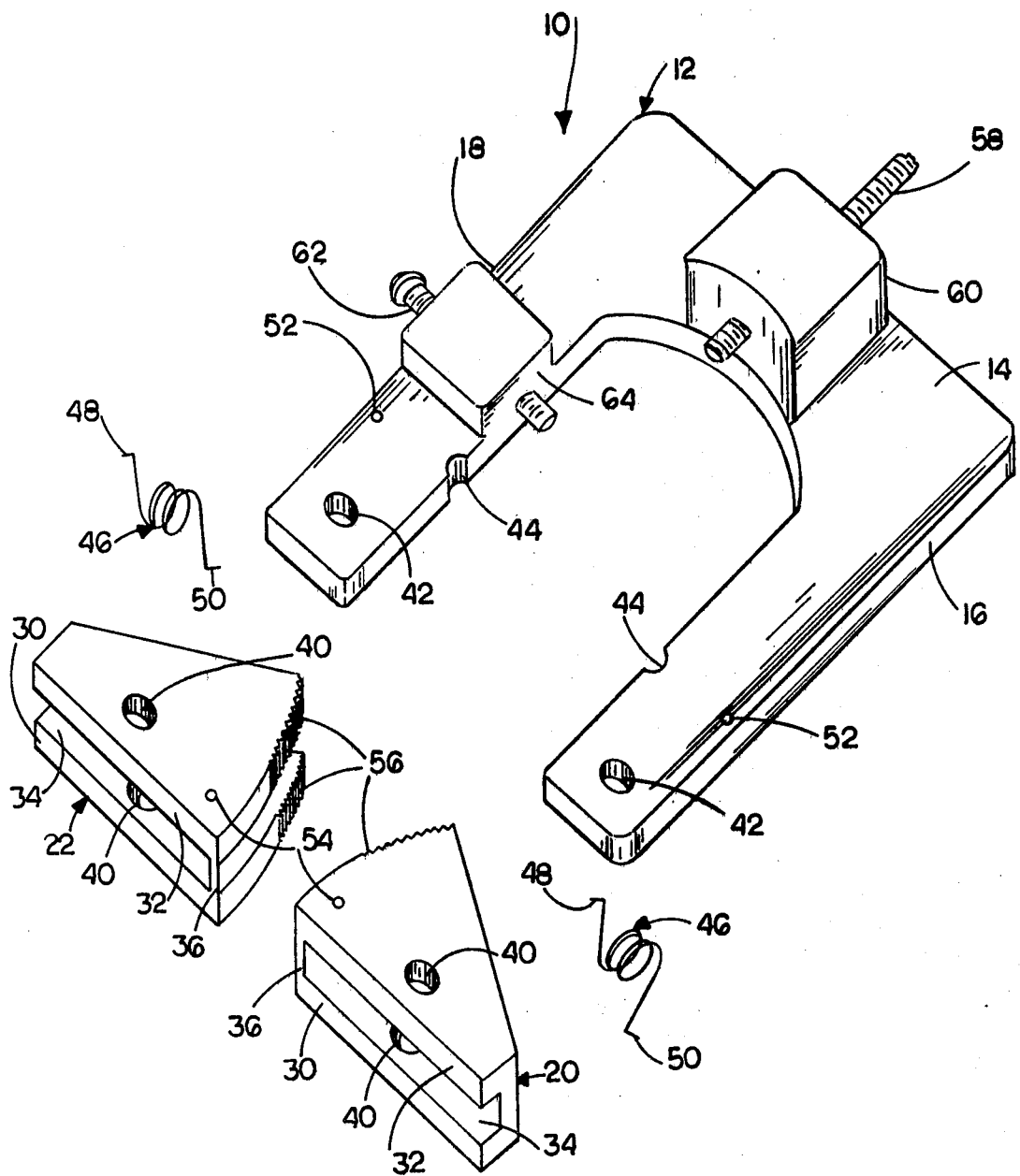
FIG. 1 is an exploded perspective view of a conduit support device constructed according to the teachings of the present invention.
Figure 2:
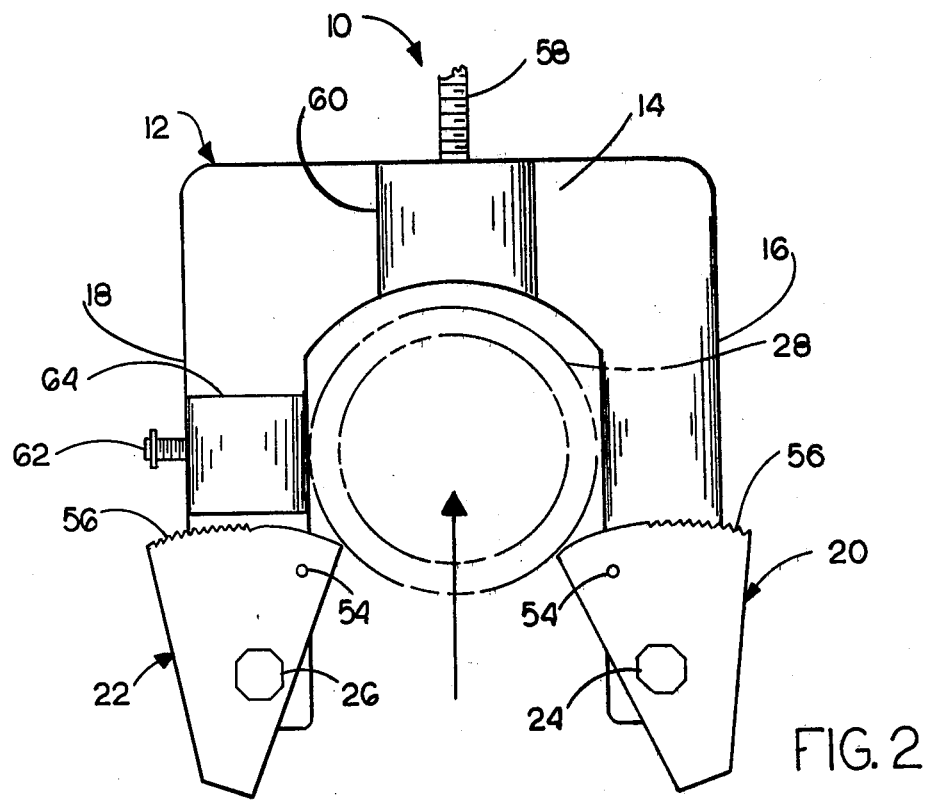
FIG. 2 is a front elevational view of the conduit support device of FIG. 1 showing the closure gates in a partially opened condition during movement of a conduit member therebetween, the conduit member being shown in dotted outline form.
Figure 3:
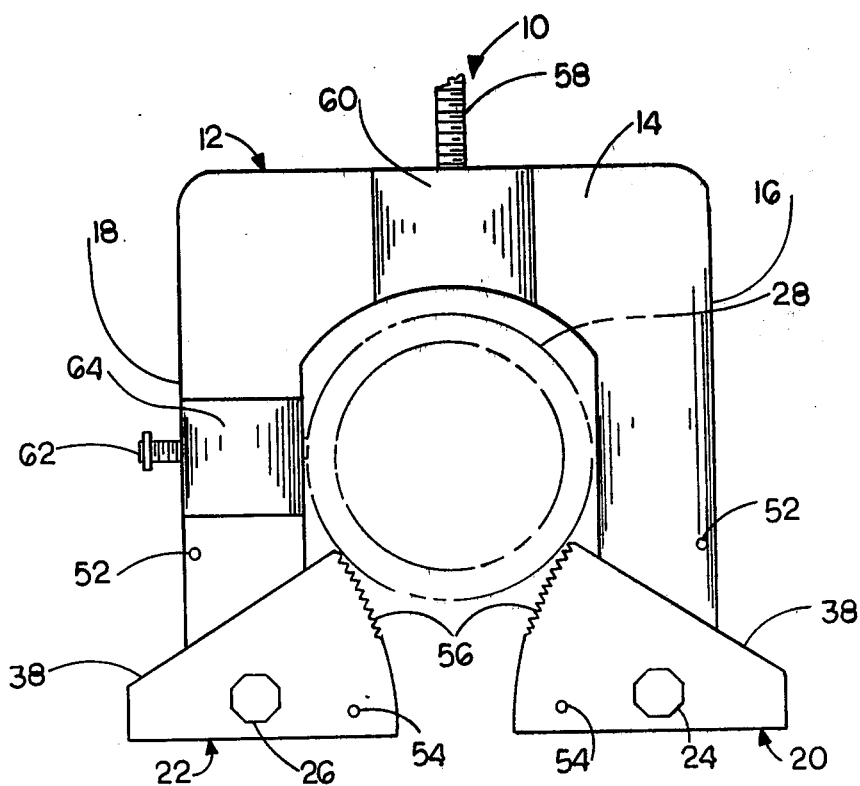
FIG. 3 is a front elevational view of the conduit support device of FIG. 1 showing the closure gates in their closed positions and supporting a conduit member thereon, the conduit member being shown in dotted outline form.

Referring to the drawings more particularly by reference numbers wherein like numerals refer to like parts, number 10 in FIG. 1 identifies a conduit support device constructed according to the teachings of the present invention. The conduit support device 10 includes a substantially U-shaped support frame member 12 having a top or cross portion 14 and spaced parallel or substantially parallel leg members 16 and 18 extending from the opposite ends of the cross portion 14 as shown in FIGS. 1-3. The support frame member 12 is preferably integrally casted from steel or some other durable material. Each leg member 16 and 18 respectively has closure means pivotally mounted thereto for controlling access to the opening or space formed between the opposed leg members. In the preferred embodiment, the closure means includes a pair of similarly shaped closure gates 20 and 22, each of which is pivotally mounted adjacent the free end of each respective leg member 16 and 18 by suitable pivot means such as by using pivot pin members 24 and 26 as shown in FIGS. 2 and 3. The closure gates 20 and 22 are rotatably movable between a first or closed position (FIG. 3) extending toward the opposite leg member to restrict or at least partially restrict access to the space between the spaced leg members 16 and 18 and a second or open position (FIG. 2) angularly related thereto to open the space between the leg members for admitting a conduit member therebetween. The support frame member 12 and the closure gates 20 and 22 are dimensioned such that a pipe, such as the pipe 28, or any other conduit member, may be inserted between the pair of closure gates and positioned so as to lie within the enclosed space formed by the support frame member and the closure gates.

Figure 4:
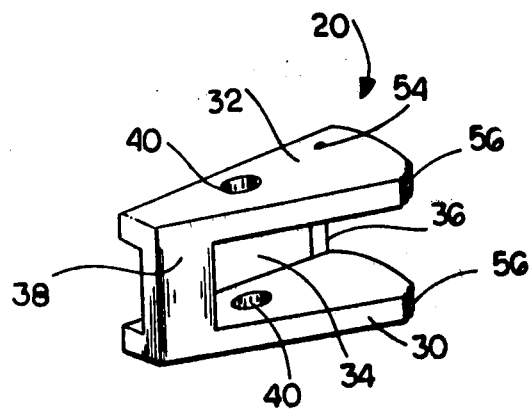
FIG. 4 is a perspective view of one of the closure gates utilized in the present device.

As shown in FIGS. 1 and 4, each closure gate includes a connected pair of opposed flange members 30 and 32 defining a space 34 therebetween. The flange members 30 and 32 are interconnected in spaced apart relationship by means of the connecting portions or members 36 and 38 positioned as more clearly shown in FIG. 4. The flanges 30 and 32 are sufficiently spaced such that the space 34 defined therebetween is sufficiently large to receive and embrace the free end of each leg member 16 and 18. Each of the flange members 30 and 32 also respectively includes an aperture 40 therethrough adaptable for receiving one of the pivot pin members 24 and 26. The apertures 40 are located on the respective flange members 30 and 32 in such a position that when the respective leg members 16 and 18 are positioned within the respective spaces 34, the apertures 40 will register with the apertures 42 in the legs 16 and 18 located near the free ends thereof. After insertion, the pivot pin members 24 and 26 can be retained therein by any suitable means. Once pivotally connected to their respective leg members, the closure gates 20 and 22 are rotatably movable between closed positions wherein the closure gates extend laterally towards each other as shown in FIG. 3 and open positions angularly related thereto. Although any suitable means for pivotally attaching the closure gates 20 and 22 to their respective leg members 16 and 18 may be utilized, the use of the pivot pin members 24 and 26 is preferred because such pivot means allow the closure gates to move freely between their open and closed positions in a smooth, continuous, uninterruped fashion.

The connecting member 36 is located adjacent the inwardly facing end of each closure gate such that when the closure gates 20 and 22 are moved to their open positions, the members 36 will engage optional indentations 44 on the insides of the respective leg members 16 and 18 as shown in FIG. 1. The indentations 44 should be sufficiently deep such that when the members 36 are received therein, the closure gates will be substantially flush with the respective leg members to provide full open access to the device. This is important because it allows substantially the entire space between the leg members 16 and 18 to be utilized for admitting a conduit member thereby facilitating the positioning and locking of a conduit member therein. Since the spacing between the respective leg members 16 and 18 can be dimensioned to correspond fairly closely to the diameter of the conduit member to be supported therewithin, the overall size of the subject device can be reduced, as compared to the known prior art constructions, to more nearly correspond to the size conduits to be supported thereby making the subject device relatively easier to handle and manipulate. The present construction also makes it possible for fewer persons to be required to install conduits and like members.

It is also important to note that the connecting flanges 38 are located adjacent the outwardly facing ends of the respective closure gates and extend between the members 30 and 32 as best shown in FIG. 4. The flanges 38 are located to engage the outer surfaces of the respective leg members 16 and 18 when in their closed positions thereby restricting movement of the closure gates beyond their closed positions. This enables the gates to provide adequate support for a conduit member when the conduit member rests upon the closed gates. The connections 38 also serve as convenient means to open the gates as will be hereinafter explained.

The closure gates 20 and 22 are normally biased towards their respective closed positions by respective coil spring members 46 as shown in FIG. 1. The spring members 46 have portions that are positioned around the respective pin members 24 and 26 in the space between the respective leg 16 or 18 and their flanges 32 and each spring includes formed end portions with end hook portions 48 and 50 (FIG. 1) for attaching to the subject device. The hook 48 on one end portion of the spring members 46 is inserted into an aperture 52 located on the respective leg members and the other hook 50 is inserted into an aperture 54 located in the flange 32. When so positioned, the spring members 46 constantly urge the respective closure gates 20 and 22 towards their closed positions restricting access to the space between the leg members. This is true regardless of the orientation of the device 10 when installed. The mere exertion of a force on closure gates 20 and 22, such as by pushing a conduit member thereagainst in a direction towards the space defined between the leg members 16 and 18 (FIG. 2), pivotally rotates the closure gates to their respective open positions in opposition to the biasing action of the spring members 46 and allows the user thereof to easily insert, but not withdraw, the conduit member into the support assembly 10. Once the conduit member is positioned therewithin and moved far enough to clear the free ends of the closure gates, the closure gates, through the urging force exerted by the spring members 46 and aided by gravity if the device is oriented extending downwardly, will again move to their normally closed positions. The conduit member can then be released to rest upon the closure gates 20 and 22 as best shown in FIG. 3. In this position the closure gates are restricted from any further movement by the connections 38 abutting the outer sidewalls of the respective leg members 16 and 18 as aforesaid.

The use of the springs 46 in conjunction with the pivot means 24 and 26 is important because it enables the device 10 to be operable in all positions regardless of its installed orientation, a feature not possible with the known prior art hangers. If the present device 10 is oriented other than vertically as shown in FIGS. 2 and 3, a conduit member supported thereby will be confined by the support frame member 12 and the closure gates 20 and 22 but may be supported by any one or more of the members 12, 20, or 22 depending upon the orientation.

The device 10 is also easy to handle, operate, and manipulate, especially by one person, and it can be quickly accessed for easy removal of the conduit member supported therein. Removal of the conduit member from the device is accomplished by simply moving the conduit member to a position such that the closure gates 20 and 22 can be pivotally rotated to their fully open positions and, while holding the closure gates in their open positions, the conduit member can be easily and quickly removed by passing it between the opened closure gates and through the space defined between the opposed leg members 16 and 18. Regardless of its installed orientation, the flange members 38 may be used as release mechanisms for opening the closure gates and removing the conduit member from within the device 10. A force exerted on the members 38, such as by using one's thumbs, in a direction outwardly away from the space defined between the leg members 16 and 18, will pivotally rotate the closure gates, in opposition to the biasing action of the spring members 46, to their fully open positions allowing full open access to the conduit member for easy removal from the device. This arrangement greatly facilitates maintenance and service of the conduit member supported therein, especially when such maintenance is performed by only one person.

The present device 10 also includes means for restricting the movement of the conduit member once it is supported within the subject assembly. For example, each inwardly facing end portion of the closure gates 20 and 22 is preferably rounded or otherwise curved as shown in FIGS. 1–4 such that, once a conduit member such as the member 28 is positioned within the device 10, the conduit member 28 rests upon the rounded end portion of the closure gates 20 and 22 when it is vertically oriented as shown in FIG. 3. In addition, each of the inwardly facing end portions of the closure gates 20 and 22 likewise preferably include a serrated upper edge such as the serrated portions 56 associated with the members 30 and 32 as shown in FIGS. 1–4. Engagement of the conduit member 28 with the serrated edge portions 56 aids in restricting fore and aft movement as well as rotational movement of the conduit member within the support assembly 10.

The present device 10 may be suspended from an overhead structure or any other support structure by any suitable means such as by attaching it to a vertically disposed threaded support rod such as the rod 58 (FIG. 1) or by welding it to any suitable attaching member. It is important to note that the subject device is preferably both weldable and operable in all positions, and if the device 10 is to be vertically rod supported, it may also include a sidewardly extending projection 60 attached to the cross portion 14 having a threaded opening therethrough adaptable to receive the threaded support rod 58. Use of a manual locking set screw 62 positioned on one or both of the leg members 16 and 18 at an intermediate location therealong (FIG. 1) further facilitates holding of the conduit member within the subject device. Like the projection 60, the support frame member 12 may also include a sidewardly extending projection 64 attached to one or both of the leg members 16 and 18 having a threaded opening positioned therethrough adaptable to receive the set screw 62. It is also recognized that the device 10 may be rod supported in a sideward position by threadingly securing the support rod 58 to the opening located in the side projection 64.

Figure 5:
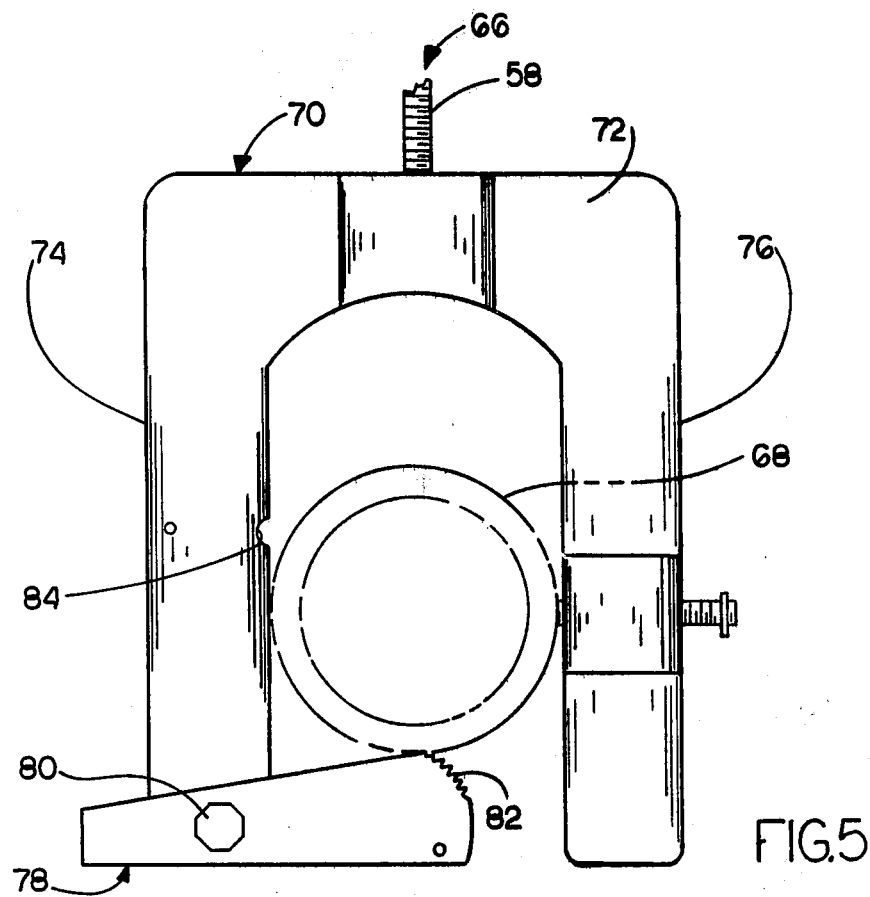
FIG. 5 is a front elevational view showing another embodiment of a device constructed according to the teachings of the present invention.

FIG. 5 discloses another embodiment 66 of the present conduit support device wherein a single closure gate is utilized to hold and support a conduit member such as the member 68 therein. The device 66 includes a substantially U-shaped support frame member 70 having a cross portion 72 and spaced parallel or substantially parallel leg members 74 and 76 extending therefrom. The support frame member 70 is similar in construction to the frame member 12 except that the leg members 74 and 76 are somewhat greater in length as compared to the members 16 and 18 as will be hereinafter explained. A single closure gate 78 is pivotally mounted near the free end of one of the leg members such as the leg member 74 by the pivot pin member 80 and extends from the leg member 74 towards the opposite leg member 76 across the space defined therebetween. The closure plate 78 is constructed substantially similar, except for length, to the closure gates 20 and 22 as hereinbefore discussed and, like the closure gates 20 and 22, the closure gate 78 is rotatably movable between a first closed position restricting access to the space between the spaced leg members and a second open position angularly related thereto to open the space between the leg members for admitting a conduit member therebetween. The closure gate 78 is likewise normally biased towards its closed position by a spring member (not shown), which spring member is constructed and attached in a manner substantially similar to the construction and attachment of the spring members 46 previously described.

In the embodiment 66, it is important that the closure gate 78 be dimensioned so as to extend sufficiently across the space between the leg members 74 and 76 such that when a conduit member such as the member 68 is positioned within the support device 66, the closure gate 78, when in its closed position, will adequately hold and support the conduit member positioned therein and prevent it from coming out of the device. The inwardly facing end of the closure gate 78 is likewise preferably rouned or otherwise curved and may include a serrated upper edge such as the serrated portion 82. Like the serrated edges 56, the serrated edge 82 aids in restricting movement of the conduit member when the conduit member is positioned thereagainst. The leg member 74 also includes an optional indentation 84, substantially similar to the indentations 44, located on the inner sidewall thereof for receiving the connecting member associated with the closure gate 78 such as the member 36 previously described in connection with the closure gates 20 and 22.

The operation of the support device 66 is substantially similar to the operation of the device 10 previously described. However, since the closure gate 78 is somewhat longer than either of the closure gates 20 or 22, the leg members 74 and 76 must be made of sufficient length to allow the conduit member positioned within the device 66 to be moved far enough to clear the free end of the closure gate 78 and thereafter permit the gate 78, through the urging force exerted by the biasing means, to return to its normally closed position. For this reason, the overall size of the device 66 will be slightly greater than that of the device 10.

Figure 6:
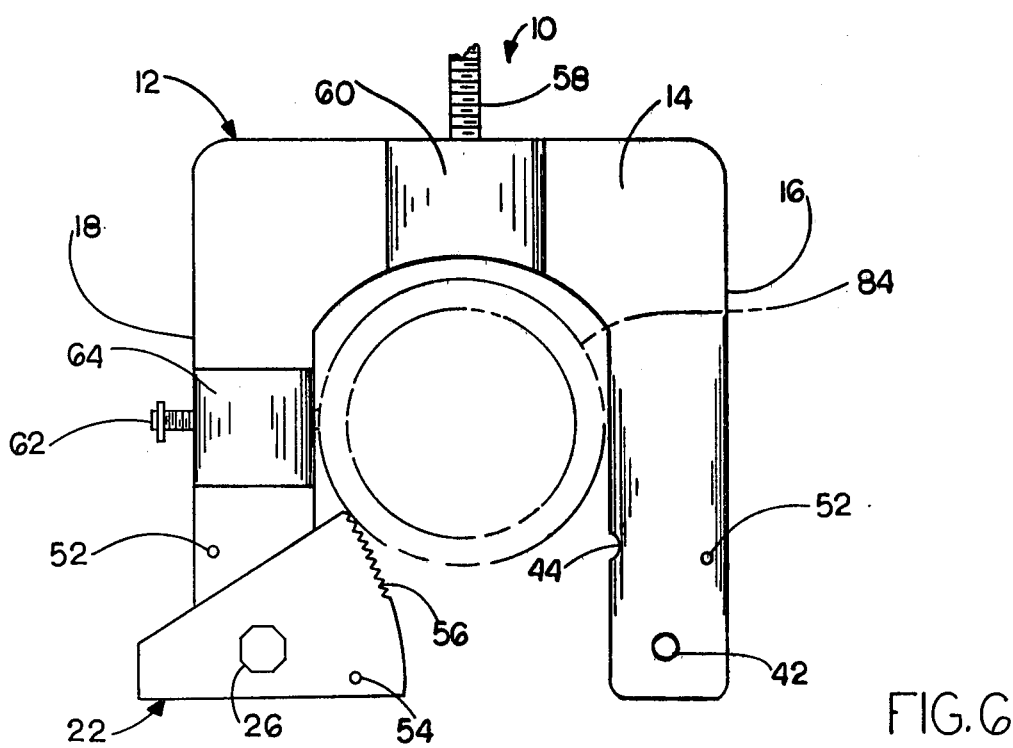
FIG. 6 is a front elevational view of the conduit support device of FIG. 1 showing only one closure gate being used.

For ease of construction and assembly, a single closure gate device such as the device 66 may also be achieved by removing one of the closure gates 20 or 22 from the device 10 as shown in FIG. 6. The device 10 is constructed such that each closure gate extends a sufficient distance across the space formed between the leg member 16 and 18 and use of only one closure gate such as the closure gate 22 (FIG. 6) will adequately hold and support a conduit member such as the member 84 therewithin. In this situation, the conduit member 84 is supported on one side by the serrated edge portion 56 of the closure gate 22 and on its opposite side by the leg member 16. The operation of the support device disclosed in FIG. 6 is identical to the operation of the device 66.

Figure 7:
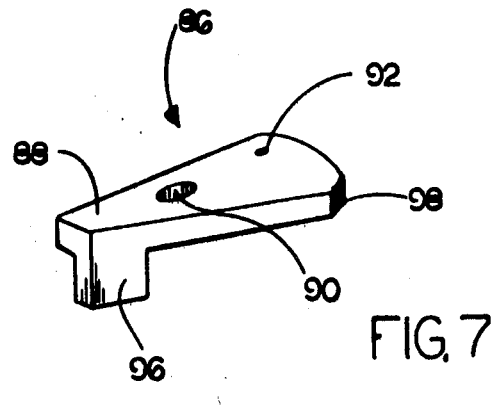
FIG. 7 is a perspective view of another embodiment of a closure gate utilized in the present device.
Figure 8:
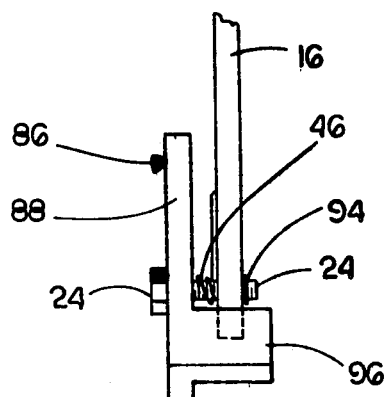
FIG. 8 is a partial side elevational view of a conduit support device showing the closure gate of FIG. 7 pivotally attached in a partially opened condition to one of the leg members.

FIG. 7 discloses another embodiment 86 of a closure gate which may be utilized with the present invention. The closure gate 86 is comprised of a single flange member 88 having an aperture 90 extending therethrough adaptable for receiving one of the pivot pin members 24 and 26. The member 88 is shaped and dimensioned substantially similar to the flange members 30 and 32 and also includes an aperture 92 adaptable for receiving the hook 50 formed on one end portion of the spring 46. The closure gate 86 is pivotally mounted to the respective leg members 16 and 18 by placing the aperture 90 in registration with the aperture 42 located near the free end of each leg member and thereafter inserting a pivot pin member such as the member 24 therethrough as shown in FIG. 8. After insertion, the pin member 24 can be retained therein by any suitable means such as by using a spring clip member 94. The clip member 94 engages a groove (not shown) in the end of the pin member 24 and prevents the member 24 from sliding out of the apertures 42 and 90. The spring member 46 is positioned around the pin member 24 in the space between the flange 88 and the leg member 16 and it is attached at its opposite ends to the members 16 and 88 respectively as previously described.

The closure gate 86 likewise includes a flange portion 96, similar to the flange 38, located adjacent the outwardly facing end of the member 88 in a position to engage the outer surface of each respective leg member when the closure gate 86 is in its closed position. Like the flange 38, the flange 96 restricts movement of the closure gate beyond its closed position and at the same time provides support for the gate. The inwardly facing end portion of the member 88 is likewise preferably rounded or otherwise curved and may include a serrated upper edge such as the serrated portion 98 for the reasons previously explained. In addition, since the closure gate 86 does not extend around or embrace the leg member to which it is attached, the gate 86 is rotatable to an open position wherein it will be substantially flush with the respective leg member to provide full open access to the device. This eliminates the need for the optional indentations 44 and 84 previously described in connection with the use of the closure gates 20, 22, and 78. Although use of closure gates constructed in a manner similar to the construction of the closure gates 20, 22, and 78 is generally preferred, the closure gate 86 is substantially simpler and less expensive to make and it works equally as well.

Although it is recognized that various acceptable materials of construction are available and could equally be employed to construct the various embodiments of the present device, it is usually preferred that the devices 10 and 66 be casted from steel or other durable materials such as certain relatively strong plastic materials and certain other metal alloys which are able to withstand moderate impact and mishandling without breakage. It is also recognized that the various embodiments of the present device may be dimensioned and constructed so as to conform to and accommodate conduit members of varying sizes. In addition, it is also highly preferred that all of the corners and exposed edges on the present devices be rounded or otherwise curved for safety reasons so that they will be smooth against the hands of a user and not rub or cause injury. Additionally, the closure gates 20, 22, 78, and 86 may be coated with an insulating material so that the subject devices may likewise hold and support electrical wires or cables.

Thus there has been shown and described several embodiments of a novel conduit support device for use in holding and supporting conduit members, which devices fulfill all of the objects and advantages sought therefor. Many changes, modifications, variations, and other uses and applications of the present construction will, however, become apparent to those skilled in the art after considering this specification and the accompanying drawings. All such changes, modifications, variations, and other uses and applications which do not depart from the spirit and scope of the invention are deemed to be covered by the invention which is limited only by the claims which follow.

What is claimed is:

1. A conduit support device operable in all angular orientations for holding and supporting a conduit member therein, said device comprising a frame member having a pair of laterally spaced leg members extending therefrom defining a space therebetween, closure means including a closure member and journal means pivotally attaching the closure member to one of said leg members adjacent the free end thereof for controlling access to the space defined between said leg members, said closure member being rotatably movable about the journal means between a closed position restricting access to the space between said leg members and an open position angularly related thereto to open the space between said leg members for admitting a conduit member therebetween, said closure member having a first portion movable between the open position substantially in alignment with the leg member to which it is pivotally attached and the closed position substantially normal thereto extending between said leg members, said closure member having a second portion engageable with the leg portion in the closed position thereof to limit movement thereof, said closure member being movable to its open position in response to a force exerted thereagainst, said force being applied in a direction towards the space defined between said leg members, and yieldable means biasing said closure member towards the closed position thereof.

2. The conduit support device defined in claim 1 wherein said frame member is substantially U-shaped in configuration and includes a cross member, said leg members extending in substantially parallel relationship from the opposite ends of said cross member.

3. The conduit support device defined in claim 1 wherein said closure member extends from one of said leg members towards the opposite leg member, said closure member being dimensioned to extend sufficiently across the space formed between said leg members when said closure member is in its closed position to hold a conduit member positioned within said device.

4. The conduit support device defined in claim 3 wherein said closure member includes means engagable with its respective leg member for limiting the movement of said closure member beyond its closed position.

5. The conduit support device defined in claim 3 wherein said closure member includes a serrated upper edge portion, said serrated portion being engagable with a conduit member positioned thereagainst to restrict movement of said conduit member within said device.

6. The conduit support device defined in claim 3 wherein said closure member and the respective leg member have means respectively engagable in the open position to allow movement of the closure member to a position substantially in alignment with said respective leg member when said closure member is in its open position.

7. The conduit support device defined in claim 1 wherein said yieldable means includes a spring member having one portion connected to the closure member and another portion connected to the leg member.

8. The conduit support device defined in claim 1 wherein the frame member is casted from steel.

9. A conduit support device operable in all positions for holding and supporting a conduit member comprising a substantially U-shaped support frame member having a cross member and a pair of spaced opposed leg members extending therefrom defining a space therebetween, a closure member and associated journal means on each of said leg members, said journal means rotatably attaching each of said closure members adjacent to the free ends of said respective leg members for controlling access to the space defined therebetween, each of said closure members being rotatable about its respective journal means between a closed position restricting access to said space and an open position angularly related thereto to open said space for admitting a conduit member therebetween, separate yieldable means associated with each leg member biasing the respective closure members toward their respective closed positions, each of said closure members being movable in opposition to the yieldable means to its open position in response to a force exerted thereagainst in a direction towards the space defined between said leg members, said closure members and said respective leg members including means which become engageable when said closure members are in their closed positions to limit movement of said closure members in their closed positions.

10. The conduit support device defined in claim 9 wherein said separate yieldable means includes a first spring member having one portion engagable with one of said leg memers and another portion engagable with the respective closure member attached thereto, and a second spring member having one portion engagable with the other of said leg members and another portion engagable with the respective closure member attached thereto.

11. The conduit support device defined in claims 1 or 9 including means for attaching said device to a support structure.

12. The conduit support device defined in claims 1 or 9 including means for restricting the movement of said conduit member once it is supported within said device.

13. The conduit support device defined in claim 12 wherein said means for restricting the movement of said conduit member once it is supported within said device includes at least one manual locking set screw positioned on one of said leg members at an intermediate location therealong, said locking set screw being engagable with the conduit member when said conduit member is supported within said device.

14. The conduit support device defined in claim 9 wherein said journal means includes a first pivot pin member attaching one of said closure members to its respective leg member and a second pivot pin member attaching the other of said closure members to its respective leg member.

15. A conduit support device adaptable for holding and supporting a conduit member comprising a support frame member, said frame member including a cross member and a pair of spaced opposed substantially parallel leg members extending from the opposite ends thereof defining a space therebetween, a closure member and associated journal means rotatably attached adjacent to the free end of each respective leg member for controlling access to the space defined therebetween, each of said closure members being rotatable about its respective journal means between a closed position wherein the respective closure members extend in a direction across the space between the leg members for restricting access to the space formed between said leg members and an open position angularly related thereto to open said space for admitting a conduit member therebetween, yieldable means on each leg member associated with the respective closure members biasing said closure members toward their closed positions regardless of the orientation of the support device, said closure members being movable in opposition to the respective yieldable means to their open positions in response to a force exerted thereagainst in a direction towards the space defined by and between said leg members and said cross member, each of said closure members including means thereon engageable with the respective leg member to establish the closed positions thereof, means located on at least one of said leg members and engageable with a conduit member being supported to limit movement thereof while being supported within said device, and means on the device for attaching said device to a support structure.

16. The conduit support device defined in claim 15 wherein said means for journalling said closure members to their respective leg members includes a first pivot pin member attaching one of said closure members to its respective leg member and a second pivot pin member attaching the other of said closure members to its respective leg member.

17. The conduit support device defined in claim 15 wherein said means for establishing the position of said closure members when in their closed positions includes a flange member on each of said closure members, said flange member being engagable with the respective leg member when said closure member is in its closed position.

18. The conduit support device defined in claims 9 or 15 including means forming a serrated edge on the closure members in position to engage a conduit being supported to restrict movement thereof.

19. The conduit support device defined in claim 15 wherein said device is made from steel.

20. The conduit support device defined in claim 15 wherein said yieldable means includes a first spring member having one portion attachable to one of said leg members and another portion attachable to the respective closure member associated therewith, and a second spring member having one portion attachable to the other of said leg members and another portion attachable to the respective closure member associated therewith.

21. A conduit support device adaptable for holding and supporting a conduit member comprising a support frame member, said frame member including a cross member and a pair of spaced opposed substantially parallel leg member extending from the opposite ends thereof defining a space therebetween, a closure member disposed adjacent to the free end of each respective leg member for controlling access to the space defined therebetween, journal means rotatably attaching said closure members to their respective leg members for movement between a closed position restricting access to the space formed between said leg members and an open position angularly related thereto to open said space for admitting a conduit member therebetween, said closure members being movable to their open positions in response to a force exerted thereagainst in a direction towards the space defined by and between said leg members, first and second spring members normally biasing said closure members towards their respective closed positions regardless of their angular orientation, said first spring member having one portion engagable with one of said leg members and another portion engagable with the respective closure member attached thereto, said second spring member having one portion engagable with the other of said leg members and another portion engagable with the respective closure member attached thereto, each of said closure members having means thereon engagable with said respective leg members for limiting the movement of said closure members when in their closed positions, means located on at least one of said leg members adjustable into engagement with a conduit member being supported for limiting the movement of the conduit member once said conduit member is supported within said device, and means for attaching said device to a support structure.

22. The conduit support device defined in claim 21 wherein said journal means for attaching said closure members to their respective leg members includes a first pivot pin member attaching one of said closure members to its respective leg member and a second pivot pin member attaching the other of said closure members to its respective leg member.

23. The conduit support device defined in claim 22 wherein said first spring member is positioned around said first pivot pin member and said second spring member is positioned around said second pivot pin member.

* * * * *

UNITED STATES PATENT OFFICE
CERTIFICATE OF CORRECTION

Patent No. 4,436,266          Dated March 13, 1984

Inventor(s) Thomas W. Gerding

It is certified that error appears in the above-identified patent and that said Letters Patent are hereby corrected as shown below:

Column 2, line 31, "positions" should be --positioned--.

Column 2, line 62, "on" should be --in--.

Column 7, line 42, "plate" should be --gate--.

Column 11, line 4, "memers" should be --members--.

Signed and Sealed this

Nineteenth Day of June 1984

[SEAL]

Attest:

GERALD J. MOSSINGHOFF

Attesting Officer     Commissioner of Patents and Trademarks